(12) United States Patent
Tamhane et al.

(10) Patent No.: US 10,425,908 B2
(45) Date of Patent: Sep. 24, 2019

(54) METHODS AND APPARATUS FOR ENABLING SPONTANEOUS LOCATION DETERMINATION IN A SCHEDULED WIRELESS COMMUNICATION ENVIRONMENT

(71) Applicant: Marvell World Trade Ltd., St. Michael (BB)

(72) Inventors: Sagar A. Tamhane, Santa Clara, CA (US); Sarang Shrikrishna Wagholikar, Sunnyvale, CA (US); Liwen Chu, San Ramon, CA (US); Hongyuan Zhang, Fremont, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 908 days.

(21) Appl. No.: 14/799,930

(22) Filed: Jul. 15, 2015

(65) Prior Publication Data
US 2016/0021496 A1    Jan. 21, 2016

Related U.S. Application Data

(60) Provisional application No. 62/024,828, filed on Jul. 15, 2014.

(51) Int. Cl.
*H04W 24/00* (2009.01)
*H04W 64/00* (2009.01)
(Continued)

(52) U.S. Cl.
CPC .............. *H04W 64/00* (2013.01); *H04B 1/40* (2013.01); *H04W 24/10* (2013.01)

(58) Field of Classification Search
None
See application file for complete search history.

(56) References Cited

U.S. PATENT DOCUMENTS

| 2003/0031182 A1* | 2/2003 | O'Neil | H03L 7/00 370/395.1 |
| 2010/0205499 A1* | 8/2010 | Axelsson | H04L 1/1614 714/748 |

(Continued)

OTHER PUBLICATIONS

"International Search Report and Written Opinion", Application No. PCT/US2015/040522, dated Oct. 22, 2015, 13 pages.

(Continued)

*Primary Examiner* — Jinsong Hu
*Assistant Examiner* — Alexander J Yi

(57) ABSTRACT

The present disclosure describes methods and apparatus for enabling spontaneous location determination in a scheduled wireless communication environment. For example embodiments, a first wireless communication device includes a transceiver and a multiple recipient communication system. The transceiver is configured to receive from a second wireless communication device a request to participate in a location determination procedure (LDP) that is to occur at least partially during a communication period that is assigned to a third wireless communication device. The multiple recipient communication system is configured to generate a multiple recipient frame that encapsulates (i) data that is destined for the third wireless communication device and (ii) a response to the request to participate in the LDP. For other example embodiments, a multiple recipient communication system of the second wireless communication device is configured to extract the response to the request to participate in the LDP from the multiple recipient frame.

20 Claims, 9 Drawing Sheets

(51) Int. Cl.
*H04B 1/40* (2015.01)
*H04W 24/10* (2009.01)

(56) References Cited

U.S. PATENT DOCUMENTS

| | | | | |
|---|---|---|---|---|
| 2013/0031182 A1* | 1/2013 | Gross | ................... | G06Q 50/00 709/205 |
| 2013/0223419 A1* | 8/2013 | Ghosh | ............... | H04W 52/0235 370/338 |
| 2013/0229996 A1* | 9/2013 | Wang | ................ | H04W 72/0413 370/329 |
| 2014/0160959 A1* | 6/2014 | Aldana | ............... | H04L 43/0864 370/252 |
| 2014/0171109 A1 | 6/2014 | Segev | | |
| 2015/0365913 A1* | 12/2015 | Aldana | ............... | H04W 64/006 370/252 |

OTHER PUBLICATIONS

Aldana,"Proposed resolution for Revmc—CID 2164", 11-14-0160-00-000m-proposed-resolution-for-revmc-cid-2164, Jan. 22, 2014, 22 pages.

* cited by examiner

700

Receive from a Second Wireless Communication Device a Request to Participate in a Location Determination Procedure that is to Occur at least partially During a Communication Period that is Assigned to a Third Wireless Communication Device
702

Generate a Multiple Recipient Frame that Encapsulates (i) Data that is Destined for the Third Wireless Communication Device and (ii) a Response to the Request to Participate in the Location Determination Procedure, the Response Destined for the Second Wireless Communication Device
704

Transmit the Multiple Recipient Frame during the Communication Period that is Assigned to the Third Wireless Communication Device
706

Fig. 7

METHODS AND APPARATUS FOR ENABLING SPONTANEOUS LOCATION DETERMINATION IN A SCHEDULED WIRELESS COMMUNICATION ENVIRONMENT

CROSS REFERENCE TO RELATED APPLICATION

This present disclosure claims priority to U.S. Provisional Patent Application Ser. No. 62/024,828 filed Jul. 15, 2014, the disclosure of which is incorporated herein by reference in its entirety.

BACKGROUND

Many wireless communication devices, such as a mobile phone or a tablet computer, can determine their current location. A current location of a wireless communication device may be determined in absolute terms or relative to one or more other wireless communication devices. One example technique uses satellite positioning service (SPS) technology, such as the global positioning system (GPS). With SPS, an SPS receiver or chip analyzes signals received from multiple different satellites to determine a location identified by at least one SPS coordinate. Multiple SPS coordinates may indicate an absolute geospatial location to a particular level of accuracy. Another example technique entails one wireless communication device transmitting or receiving signals with one or more other wireless communication devices. A distance between two or more wireless communication devices may be ascertained using an analysis of time of flight (TOF) information from the transmitted or received signals. A location of a second wireless communication device that is determined using a TOF analysis may be relative to a first wireless communication device or may comprise a representation of a proximity to the first wireless communication device. Further, if an absolute location of the first wireless communication device is obtainable, then an absolute geospatial location to a particular level of accuracy may be determined for the second wireless communication device.

A determined location of a wireless communication device may be utilized for many different purposes across a range of activities. For example, navigational instructions may be provided to a user of the wireless communication device based on a location of the device. Additionally, location-based services may be provided using a location of a wireless communication device. Location-based services may be related, in addition to navigational aid, to tourism, gaming, marketing, augmented reality, private or commercial car sharing, finding a lost wireless communication device, and so forth. As another example purpose of a location, a given wireless communication device may elect to communicate with another wireless communication device based on location to facilitate a higher quality current communication link or a probable higher quality future communication link.

These activities are curtailed, however, if a current location cannot be determined.

SUMMARY

This specification describes a first wireless communication device for enabling spontaneous location determination in a scheduled wireless communication environment. The first wireless communication device includes a transceiver and a multiple recipient communication system. The transceiver may be configured to receive from a second wireless communication device a request to participate in a location determination procedure that is to occur at least partially during a communication period that is assigned to a third wireless communication device. The multiple recipient communication system may be configured to generate a multiple recipient frame that encapsulates (i) data that is destined for the third wireless communication device and (ii) a response to the request to participate in the location determination procedure, with the response destined for the second wireless communication device.

This specification also describes a second wireless communication device for enabling spontaneous location determination in a scheduled wireless communication environment. The second wireless communication device includes a transceiver and a multiple recipient communication system. The transceiver may be configured to transmit to a first wireless communication device a request to participate in a location determination procedure. The transceiver may further be configured to receive from the first wireless communication device a multiple recipient frame that encapsulates (i) data that is destined for a third wireless communication device and (ii) a response to the request to participate in the location determination procedure, with the response destined for the second wireless communication device. The multiple recipient communication system may be configured to extract the response to the request to participate in the location determination procedure from the multiple recipient frame.

This specification also describes a method by a first wireless communication device for enabling spontaneous location determination in a scheduled wireless communication environment. The method may include receiving from a second wireless communication device a request to participate in a location determination procedure that is to occur at least partially during a communication period that is assigned to a third wireless communication device. The method may also include generating a multiple recipient frame that encapsulates (i) data that is destined for the third wireless communication device and (ii) a response to the request to participate in the location determination procedure, with the response destined for the second wireless communication device. The method may further include transmitting the multiple recipient frame during the communication period that is assigned to the third wireless communication device.

BRIEF DESCRIPTION OF THE DRAWINGS

In the figures, the left-most digit of a reference number typically identifies the figure in which the reference number first appears. The use of the same reference number in different instances in the description and the figures indicates like elements.

FIGS. 5-1, 5-2, and 5-3 show timing-related frame structures, including multiple-recipient timing-related frame structures, that may be employed to enable spontaneous location determination in conjunction with scheduled wireless communications in accordance with one or more example embodiments.

FIG. 7 is a flowchart illustrating an example process for enabling spontaneous location determination in a scheduled wireless communication environment for an access point in accordance with one or more example embodiments.

DETAILED DESCRIPTION

Figure 1:
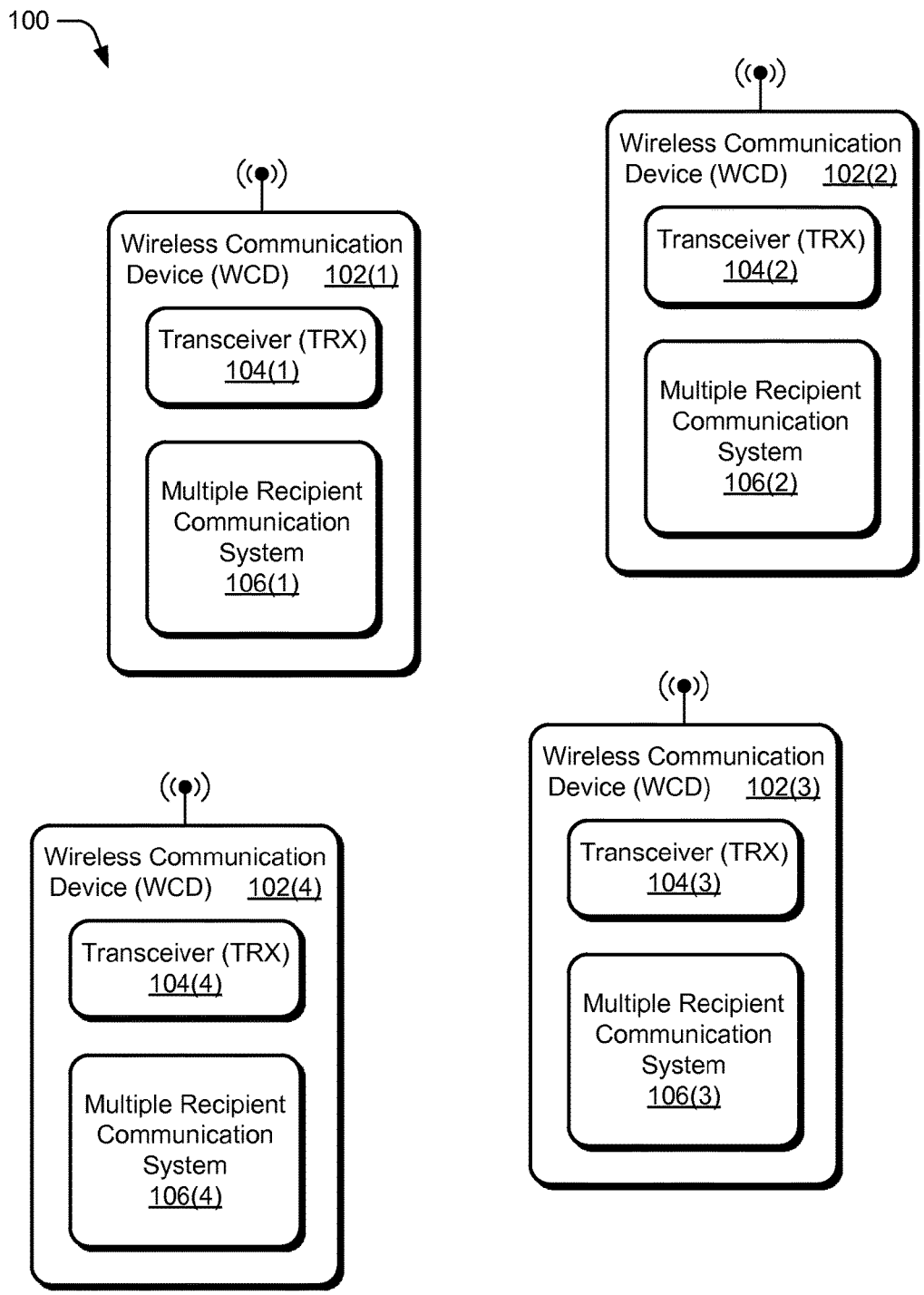
FIG. 1 illustrates wireless communication devices for which methods and apparatus for enabling spontaneous location determination in a scheduled wireless communication environment may be implemented in accordance with one or more example embodiments.

As noted hereinabove, many activities that involve a wireless communication device may utilize a location of the wireless communication device. Such activities may range from those that are clearly apparent to an end user, such as a requested location-based service, to those that may be less noticeable, such as selection of a current or future wireless communication device that is likely to provide a strong signal connection. Performance of location-related activities by a wireless communication device may be slowed or even stopped if location determination is hampered for one reason or another. If a second wireless communication device is attempting to make a location determination via a wireless signal exchange with a first wireless communication device, then the location determination may be delayed or even prevented if the first wireless communication device is too busy to participate in the wireless signal exchange. For certain example embodiments as described herein below, (i) a likelihood that a given wireless communication device is too busy to participate in a location determination procedure or (ii) an amount of time during which a given wireless communication device is unable to participate in a location determination procedure may be reduced.

By way of example but not limitation, certain scenarios or implementations are described herein using terms or a context that specifically include an access point (AP) or a client station (CS) so as to facilitate understanding. Nevertheless, the principles and embodiments described herein are applicable to wireless communication devices generally. Furthermore, particular aspects of one or more parts or versions of the IEEE 802.11 standard are referenced herein to describe specific example implementations. However, the principles and embodiments described herein are applicable to other wireless communication standards and to wireless technology generally. Thus, after general aspects and example embodiments are described herein below, an access point and one or more client stations that are operating in accordance with Wi-Fi or an IEEE 802.11-compliant protocol are used to describe more specific aspects and example implementations.

In some wireless scenarios, access to an air interface is unscheduled. With carrier sense multiple access (CSMA), for example, a client station that is a would-be transmitter first listens to a desired channel. If the desired channel is busy, the client station waits for a period of time and then again receives on the channel. This listening is repeated until the desired channel is available, and a transmission is started on the channel. Although the desired channel is apparently available if no traffic is detected, another client station may attempt to transmit at the same time. Simultaneous or overlapping transmissions may cause a collision, which leads to delays and possibly repeated transmission attempts. In addition to delays or an overall decrease in system bandwidth, transmission collisions may also waste battery power while signal transmissions are repeated and a device stays awake to make the repeated transmission attempts.

In contrast, in other wireless scenarios, access to an air interface is scheduled. For example, an access point may preemptively assign respective communication periods to respective ones of a number of associated client stations. On the one hand, by having pre-arranged communication periods assigned to client stations, a given client station may save power by sleeping outside of a particular communication period that is assigned to the given client station. On the other hand, the access point is obligated to transmit frames for the given client station during the particular communication period that is assigned to the given client station. Accordingly, the access point cannot simply elect to delay a transmission for an associated client station during a communication period that is assigned thereto in favor of another transmission without unduly affecting service to the associated client station as well as causing harmful effects to overall system operability.

In some wireless situations, a location determination procedure between at least two wireless communication devices may be preplanned (e.g., may be performed at a known, such as a negotiated or an agreed-upon, time or may not be spontaneous). For example, a client station may ask an access point to establish a time at which an exchange of signals to effectuate a location determination procedure may be initiated. In contrast, in other wireless situations, a location determination procedure between at least two wireless communication devices may be spontaneous (e.g., unplanned, without notice to a non-initiating device, or without a negotiated or agreed-upon time). For example, a client station may transmit to an access point a first signal that is part of a location determination procedure without asking or without warning the access point. After transmission of the first signal by the client station, the client station expects to receive a second signal from the access point in accordance with an established location determination procedure protocol.

Unfortunately, problems may develop if a spontaneous location determination procedure is attempted in a wireless scenario in which access to an air interface is scheduled. For example, an access point may be obligated to transmit data to an associated client station during an assigned communication period. If a non-associated client station transmits to the access point a spontaneous request to participate in a location determination procedure during the communication period that is assigned to the associated client station, the access point will not be able to respond to the request in a timely manner as well as meet obligations to transmit data to the associated client station using a traditional single recipient frame structure. Consequently, the non-associated requesting client station will experience delays, consume a greater amount of power, create additional network traffic attempting to initiate a location determination procedure with another device, or possibly make incorrect assumptions about a status of the access point.

For certain example embodiments, a multiple recipient frame structure is employed. In a communication environment in which access to a wireless air interface is scheduled, a client station that is associated with an access point is assigned a particular communication period. A client station that is not associated with the access point transmits a spontaneous request to the access point to participate in a location determination procedure during the particular communication period that is assigned to the associated client station. To handle both obligations, an access point generates a multiple recipient frame that includes (i) data destined for the associated client station and (ii) information, which is related to a location determination procedure, destined for the non-associated client station. The multiple recipient frame is transmitted from the access point to the associated client station and to the non-associated client station.

The associated client station strips out the information destined for the non-associated client station and processes the data that was destined for the associated client station. The non-associated client station filters out the data that was destined for the associated client station and extracts the information related to the requested location determination procedure for further processing. In one multiple recipient frame, information destined for the requesting non-associated client station may include an affirmative response indication for the location determination procedure request. In a subsequent multiple recipient frame, information destined for the requesting non-associated client station may include one or more time indications representing a time of arrival for a received signal or a time of departure for a transmitted signal from a perspective of the access point. Hence, a spontaneous request for participation in a location determination procedure that is received by an access point may be accepted by the access point while the access point continues to fulfill an obligation to transmit data to, or otherwise communicate with, an associated client station during a particular communication period that is assigned to the associated client station.

In an example Wi-Fi usage scenario, wireless communication devices that are otherwise functioning in accordance with an IEEE 802.11 standard may be modified to utilize a multiple recipient frame as described herein. An IEEE 802.11-compliant system may be operating under a Scheduled type of Automatic Power Save Delivery (S-APSD) mechanism. With S-APSD, respective service periods are assigned to respective associated client stations by an access point. For a particular service period, the access point communicates with an assigned client station. An IEEE 802.11-compliant wireless communication device may be operating in an as-soon-as-possible (ASAP) mode. In an ASAP mode, a client station does not ask an access point for a start time for a burst of transmissions for a location determination procedure. If an access point receives from a first, non-associated client station a request to start a location determination procedure during a service period that is assigned to a second, associated client station, the access point may transmit a signal formulated in accordance with a multiple recipient frame structure as described herein. Specifically, a multiple recipient frame may include (i) data destined for the second client station and (ii) information related to making a fine timing measurement (FTM) destined for the first client station.

FIG. 1 illustrates at 100 generally four wireless communication devices 102 for which methods and apparatus for enabling spontaneous location determination in a scheduled wireless communication environment may be implemented in accordance with one or more example embodiments. As illustrated, FIG. 1 includes multiple wireless communication devices (WCDs) 102, each of which may include at least one transceiver (TRX) 104 and at least one multiple recipient communication system 106. A wireless communication device 102 may comprise any object that includes a wireless capability, such as a fixed station, a mobile station, a handset, a system on a chip (SoC), a combination thereof, and so forth. Additional examples of a wireless communication device 102, as well as a description of various components thereof, are provided herein below with particular reference to FIG. 9.

As shown, there are four wireless communication devices 102(1), 102(2), 102(3), and 102(4) depicted in a clockwise order starting from the top left corner. A wireless communication device 102(1) may include at least a transceiver 104(1) and a multiple recipient communication system 106 (1). A wireless communication device 102(2) may include at least a transceiver 104(2) and a multiple recipient communication system 106(2). A wireless communication device 102(3) may include at least a transceiver 104(3) and a multiple recipient communication system 106(3). And a wireless communication device 102(4) may include at least a transceiver 104(4) and a multiple recipient communication system 106(4). Although four wireless communication devices 102 are specifically shown by way of example in FIG. 1, one, two, three or more wireless communication devices 102 may generally operate or interoperate to enable spontaneous location determination in a scheduled wireless communication environment.

For certain example embodiments, multiple recipient communication functionality may be distributed between or among one or more wireless communication devices 102, such as wireless communication devices 102(1), 102(2), 102(3), or 102(4). Different one(s) of wireless communication devices 102 may perform particular functionality individually or jointly at various times. Also, multiple recipient communication functionality may be included in some wireless communication devices 102 but omitted from or latent in other ones. For instance, multiple recipient communication functionality may be included in wireless communication devices with a relatively recent protocol version or active in devices that are currently utilizing a location fix, but the functionality may be omitted from devices with a relatively older protocol version or latent in devices that are not currently engaging in a location-based service.

For certain example implementations, a transceiver 104 may include a transmitter, a receiver, both a transmitter and a receiver, logic to operate a transmitter or receiver in accordance with (e.g., one or more physical, data link, or network layers of) at least one wireless standard for propagating signals, a receiver chain, a frequency converter, a filter, some combination thereof, and so forth. A wireless communication device 102 may be capable of transmitting a wireless signal, receiving a wireless signal, both transmitting and receiving wireless signals, or some combination thereof using a transceiver 104 via at least one wireless channel. A multiple recipient communication system 106 may be configured to process signals that have been received or that are to be transmitted via a transceiver 104, including but not limited to those signals that facilitate or otherwise pertain to enabling spontaneous location determination in a scheduled wireless communication environment. Signal processing may include, but is not limited to, interpreting, decoding, formulating, generating, segmenting—such as separating parts of, filtering out, or extracting from—a frame included as a portion of, responding to, or a combination thereof one or more signals. For certain example embodiments, as described further herein, a multiple recipient communication system 106 may use one or more multiple recipient frame structures to format signals as described herein below to handle spontaneous location determination requests.

Figure 2:
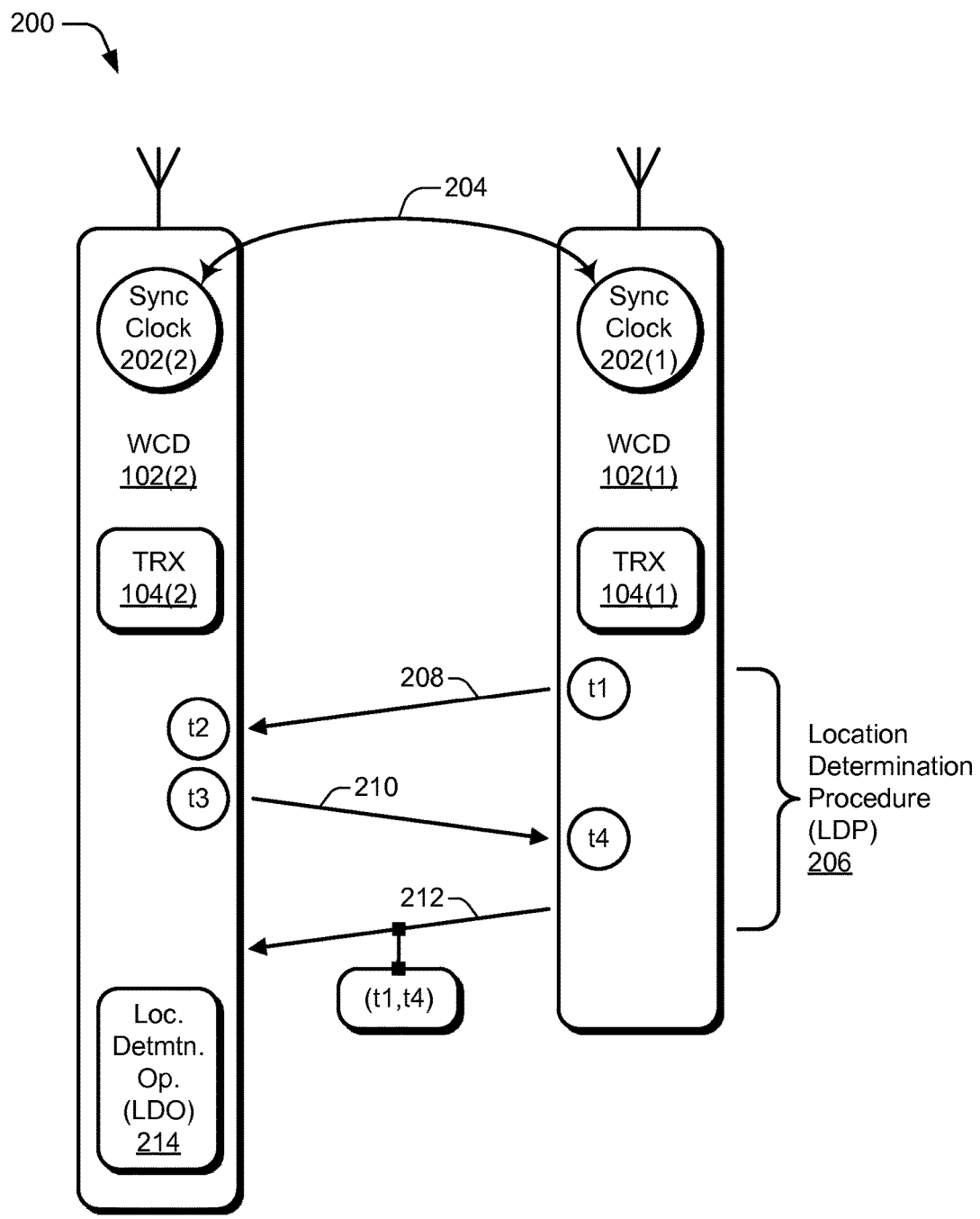
FIG. 2 depicts an example location determination procedure in which two wireless communication devices are participating.

FIG. 2 depicts at 200 generally an example location determination procedure 206 in which two wireless communication devices 102 are participating. As illustrated, FIG. 2 includes a first wireless communication device 102(1); a second wireless communication device 102(2); synchronization signaling 204; a location determination procedure (LDP) 206; and signals 208, 210, and 212. First wireless communication device 102(1) includes a first synchronized clock 202(1) and a first transceiver 104(1). Second wireless communication device 102(2) includes a second synchronized clock 202(2), a second transceiver 104(2), and a location determination operation (LDO) 214.

Some approaches to location determination use a time of departure or a time of arrival of at least one signal to compute a distance between a transmitter and a receiver. A time of flight (TOF) may be computed by the difference between the time of departure and the time of arrival. To facilitate an accurate time of flight computation, clocks at the transmitter and the receiver may be synchronized with each other to a particular degree. The closer the clocks are synchronized, the more accurate a computed time of flight can generally be. In FIG. 2, first synchronized clock 202(1) of first wireless communication device 102(1) may be synchronized with second synchronized clock 202(2) of second wireless communication device 102(2) using synchronization signaling 204 to set or adjust one or more clock time values.

For certain example embodiments, location determination procedure 206 includes an exchange of one or more signals (e.g., signal 208, signal 210, or signal 212) between first wireless communication device 102(1) and second wireless communication device 102(2). Signal 208 is transmitted by first wireless communication device 102(1) and received by second wireless communication device 102(2). Signal 208 has a time of departure from first wireless communication device 102(1) of t1 and a time of arrival at second wireless communication device 102(2) of t2. Signal 210 is transmitted by second wireless communication device 102(2) and received by first wireless communication device 102(1). Signal 210 has a time of departure from second wireless communication device 102(2) of t3 and a time of arrival at first wireless communication device 102(1) of t4.

Signal 212 is transmitted from first wireless communication device 102(1) and received at second wireless communication device 102(2). Signal 212 includes time of departure t1 from first wireless communication device 102(1) for signal 208 and time of arrival t4 at first wireless communication device 102(1) for signal 210. With a location determination operation 214, second wireless communication device 102(2) may determine a current location, at least relative to first wireless communication device 102(1), using a time of flight analysis with at least two time indications selected from t1, t2, t3, or t4. Using a time of flight analysis, a determined location may comprise at least an estimated or an approximate distance range between two wireless communication devices 102.

For example Wi-Fi implementations, there is a Wireless Location Services (WLS) protocol as part of IEEE 802.11. With WLS, two wireless communication devices, such as an access point and a client station, send management frames to each other and record a time at which the frames are sent and received as timestamps. At least one time of flight of the management frames is computed from the recorded timestamps. A distance between the access point and the client station can be computed using the time of flight of the management frames.

Figure 3:
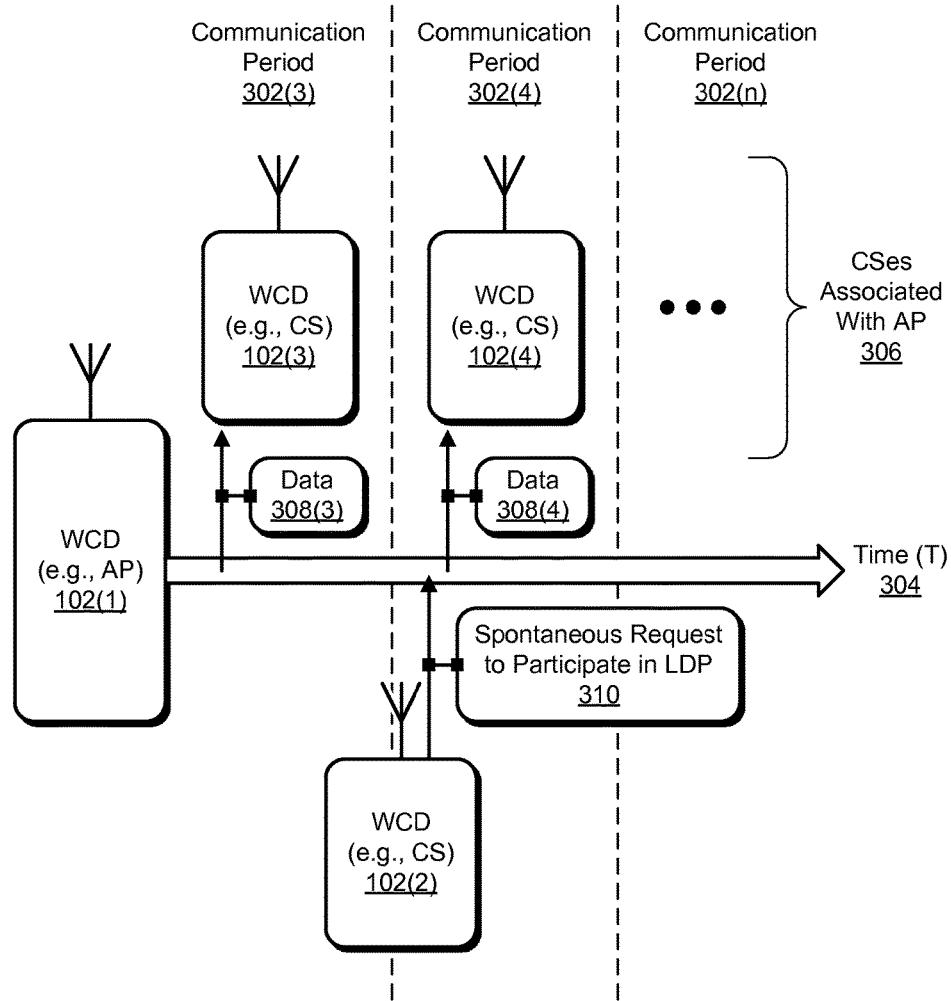
FIG. 3 depicts an example scheduled wireless communication environment in which respective wireless communication devices are assigned to respective communication periods.

FIG. 3 depicts an example scheduled wireless communication environment 300 in which respective wireless communication devices 102 are assigned to respective communication periods 302. As illustrated, scheduled wireless communication environment 300 includes a first wireless communication device 102(1), a second wireless communication device 102(2), a third wireless communication device 102(3), a fourth wireless communication device 102(4), multiple communication periods 302, a time indication arrow 304, data 308, and at least one spontaneous request 310. By way of example only, first wireless communication device 102(1) comprises an access point (AP), and second, third, and fourth wireless communication devices 102(2,3,4) comprise a client station (CS).

For certain example embodiments, scheduled wireless communication environment 300 operates by dividing time, as represented by time indication arrow 304, into different communication periods 302, up to a communication period 302(n). Each respective wireless communication device 102 that is associated with first wireless communication device 102(1), which is the access point, may be assigned a respective communication period 302. Third wireless communication device 102(3) and fourth wireless communication device 102(4) are client stations (CSes) that are currently associated with the access point, as indicated at 306. Typically, the access point is responsible for assigning communication periods 302 to associated client stations.

As shown, a third communication period 302(3) is assigned to third wireless communication device 102(3), and a fourth communication period 302(4) is assigned to fourth wireless communication device 102(4). During a particular communication period 302, first wireless communication device 102(1) is scheduled (e.g., planning, expected, or obligated) to communicate via one or more transmissions or receptions with another wireless communication device 102 that is assigned to the particular communication period 302. During third communication period 302(3), first wireless communication device 102(1) transmits third data 308(3) to third wireless communication device 102(3) in one or more packets over one or more transmissions. During fourth communication period 302(4), first wireless communication device 102(1) transmits fourth data 308(4) to fourth wireless communication device 102(4) in one or more packets over one or more transmissions.

In an example scenario, second wireless communication device 102(2) is not currently associated with the access point, first wireless communication device 102(1). Second wireless communication device 102(2) intends or wishes to engage in a location determination procedure (LDP) with first wireless communication device 102(1). As described herein above, a location determination procedure may be preplanned. In other words, a time to start a location determination procedure may be announced or negotiated in advance for a preplanned or non-spontaneous location determination procedure. Alternatively, a location determination procedure may be spontaneous. For a spontaneous location determination procedure, although an initiating wireless communication device may individually plan or intend to initiate the location determination procedure, a location determination procedure or a request therefor may be considered spontaneous if a wireless system or a non-initiating wireless communication device that is to participate in the procedure or is to receive the request does not have knowledge of or warning about the upcoming location determination procedure request.

As illustrated, second wireless communication device 102(2) transmits to the access point (first wireless communication device 102(1)) a spontaneous request 310 to participate in a location determination procedure. Spontaneous request 310 is transmitted during fourth communication period 302(4) or at a time such that a response or a timing signal transmission by first wireless communication device 102(1) would occur during fourth communication period 302(4). With a spontaneous request 310, a response is expected within a defined time period that may be shorter than a length of a communication period 302. Consequently, first wireless communication device 102(1) may be unable to satisfy an obligation to transmit fourth data 308(4) to fourth wireless communication device 102(4) during fourth communication period 302(4) and also separately respond to spontaneous request 310 within a defined time period as expected by second wireless communication device 102(2). However, first wireless communication device 102(1) may satisfy the obligation to transmit fourth data 308(4) and also respond to spontaneous request 310 in a timely manner by making at least one transmission that is formatted in accordance with frame structures that are describe herein (e.g., with particular reference to FIGS. 5-1, 5-2, and 5-3) for multiple recipients.

For example Wi-Fi implementations, different power save schemes or mechanisms are available for adoption in different systems, by different devices, at different times, or some combination thereof. One example is Automatic Power Save Delivery (APSD). With APSD, there is a corresponding "service period" established between an access point and individual ones of associated client stations. Frames are exchanged between the access point and the client stations in respective corresponding service periods. There are two types of APSD that are adopted to save battery power: unscheduled APSD (U-APSD) and scheduled APSD (S-APSD). With U-APSD, a client station signals the access point to deliver any buffered data. With S-APSD, on the other hand, a start of as well as a duration of service periods are established a priori between the access point and the client stations. The communication schedule is generally assigned by the access point such that the access point is to service one client station during each service period and so that a client station may wake up for an assigned service period and sleep during other service periods.

In example Wi-Fi implementations, requests for participation in a location determination procedure may be effectuated using one of two modes: an as-soon-as-possible (ASAP) mode and a non-ASAP mode. With a non-ASAP mode, an initiating station asks for a burst of timing signals to start at certain time (e.g., at a certain timing synchronization function (TSF) value) with a request frame. A responding station is expected to reply back within 10 milliseconds (ms) of receiving the request frame. The responding station is permitted to propose a different value for the start of the timing signal burst. In contrast, with an ASAP mode, an initiating station does not ask for a start time for a timing signal burst. The initiating station sets an ASAP bit in a fine timing measurement (FTM) request frame. A responding station is expected to start the burst of timing signals within 10 ms of receiving the request frame. If the station that is expected to respond does not reply back within 10 ms, the initiating station has a responsibility to decide whether to continue or to restart the FTM process.

With example Wi-Fi implementations, a problem or conflict may develop if an ASAP mode request combines with an S-APSD mechanism. S-APSD schedules are created between an access point and client stations that are associated with the access point. A WLS FTM exchange can be performed without a client station being associated to the access point. As a result, an access point may have already created a schedule with associated client stations when an FTM request frame is received from a non-associated client station. Because the station that is to respond to the FTM request frame (i.e., the access point here) is expected to start a timing signal burst within 10 ms of receiving the FTM request frame, the receiving station (i.e., the access point) may not be able to always satisfy an FTM request made in the ASAP mode using traditional IEEE 802.11 frames.

Figure 4:
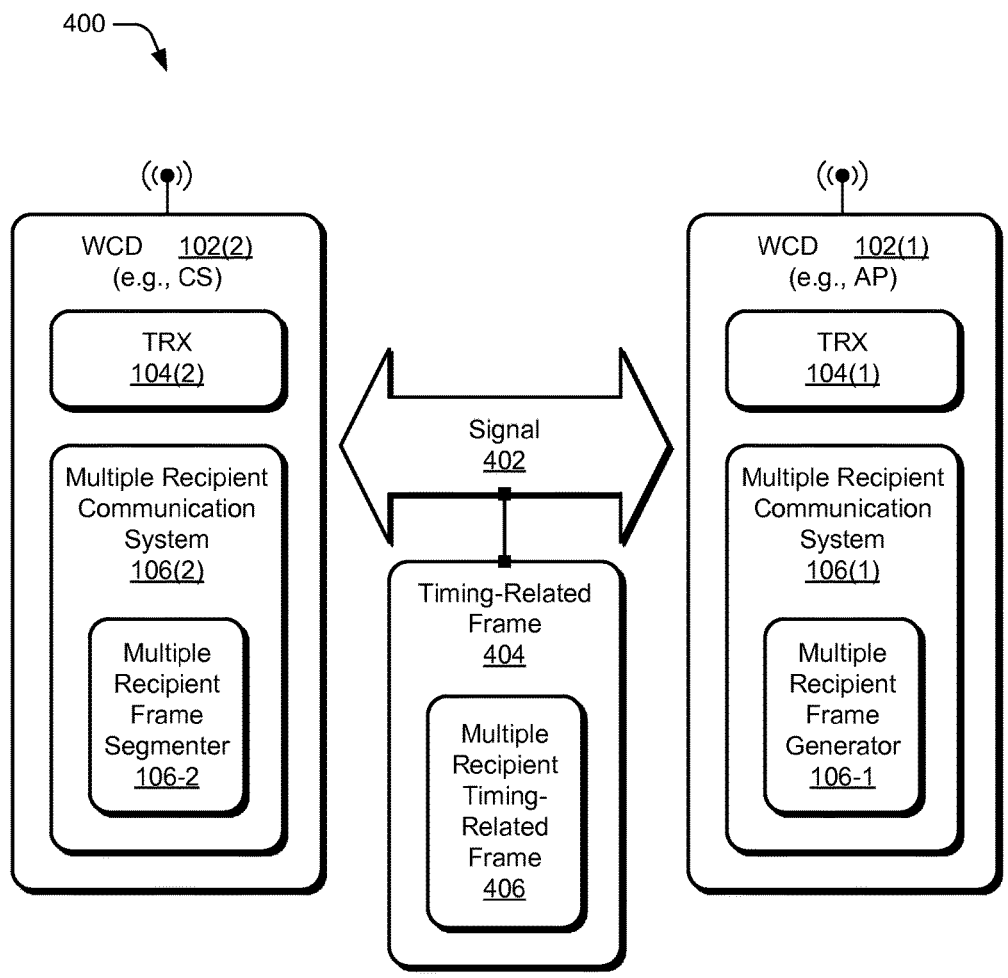
FIG. 4 illustrates two wireless communication devices that are configured to exchange signals having timing-related frames to support a spontaneous location determination request in accordance with one or more example embodiments.

FIG. 4 illustrates at 400 generally two wireless communication devices 102 that are configured to exchange signals 402 having timing-related frames 404 to support a spontaneous location determination request in accordance with one or more example embodiments. As illustrated, FIG. 4 includes a first wireless communication device 102(1), a second wireless communication device 102(2), one or more signals 402, and one or more timing-related frames 404. First wireless communication device 102(1) includes a first transceiver 104(1) and a first multiple recipient communication system 106(1), which includes a multiple recipient frame generator 106-1. Second wireless communication device 102(2) includes a second transceiver 104(2) and a second multiple recipient communication system 106(2), which includes a multiple recipient frame segmenter 106-2. Timing-related frames 404 include one or more multiple recipient timing-related frames 406. In example implementations, first wireless communication device 102(1) may comprise an access point, and second wireless communication device 102(2) may comprise a client station.

For example embodiments, second wireless communication device 102(2) is configured to exchange (e.g., transmit or receive) one or more signals 402 with first wireless communication device 102(1), and first wireless communication device 102(1) is configured to exchange one or more signals 402 with second wireless communication device 102(2). A signal 402 may be formatted in accordance with a structure defined for one or more timing-related frames 404. A timing-related frame 404 pertains, for example, to a frame that supports or facilitates acquisition of timing measurements of signals that propagate between at least two wireless communication devices. Timing measurements may be used in a location determination operation 214 (e.g., of FIG. 2). A timing-related frame 404 may comprise a multiple recipient timing-related frame 406. A multiple recipient timing-related frame 406 pertains, for example, to a frame that supports or facilitates acquisition of timing measurements of at least one propagated signal for one wireless communication device and also provides for data carriage for another wireless communication device. Examples of timing-related frames 404 are described herein below with particular reference to FIGS. 5-1, 5-2, and 5-3. Examples of multiple recipient timing-related frames 406 are described herein below with particular reference to FIGS. 5-1 and 5-2.

Second multiple recipient communication system 106(2) includes a multiple recipient frame segmenter 106-2. Multiple recipient frame segmenter 106-2 is configured to segment a multiple recipient timing-related frame 406 into different parts or segments based at least partially on whether a segment is destined for second wireless communication device 102(2). For example, multiple recipient frame segmenter 106-2 may filter out one or more segments that are destined for a different wireless communication device (e.g., data intended for another device) or may extract for further processing one or more segments that are intended for second wireless communication device 102(2) (e.g., timing-related information of a location determination procedure 206 in which second wireless communication device 102(2) is currently participating).

First multiple recipient communication system 106(1) includes a multiple recipient frame generator 106-1. Multiple recipient frame generator 106-1 is configured to generate at least one multiple recipient timing-related frame 406 that includes at least one segment destined for second wireless communication device 102(2) and at least one other segment destined for a different wireless communication device. For example, multiple recipient frame generator 106-1 may generate a frame that includes signal timing information destined for second wireless communication device 102(2) and data destined for a different wireless communication device during a communication period that is assigned to the different wireless communication device.

Multiple recipient frame generator 106-1 is described with regard to first wireless communication device 102(1), and multiple recipient frame segmenter 106-2 is described with regard to second wireless communication device 102(2). However, a single wireless communication device may include both a multiple recipient frame generator 106-1 and a multiple recipient frame segmenter 106-2 in other embodiments to account for situations in which a given device performs different roles (e.g., access point, associated client station, or non-associated client station) with respect to different devices substantially simultaneously, to account for situations in which a given device performs different roles at different times, and so forth.

FIGS. 5-1, 5-2, and 5-3 show timing-related frame structures 500-1, 500-2, and 500-3, which include multiple recipient timing-related frame structures 500-1 and 500-2. Timing-related frame structures 500-1, 500-2, and 500-3 are usable to enable spontaneous location determination in conjunction with scheduled wireless communications in accordance with one or more example embodiments. Example embodiments for content or organization of timing-related frame structures 500-1, 500-2, and 500-3 are described with reference to FIGS. 5-1, 5-2, and 5-3. Example embodiments for usage of frames 406-1, 406-2, and 404-1 that respectively correspond to FIGS. 5-1, 5-2, and 5-3 are described herein below with particular reference to FIG. 6.

For example embodiments, propagated signals may be formatted in accordance with at least one timing-related frame structure 500-1, 500-2, or 500-3. Each of timing-related frame structures 500-1, 500-2, and 500-3 includes a block having an ellipses illustrated therein. The blocks with ellipses indicate that additional data or information may be included in a given timing-related frame structure 500-1, 500-2, or 500-3 at the noted positions or at other positions of the frame structure. Also, illustrated segments of timing-related frame structures 500-1, 500-2, and 500-3 may be arranged in alternative orders. As used herein, the term "frame" may refer to at least one message or contents thereof, and the term "segment" may refer to one or more fields or contents thereof.

Figures 1, 5:
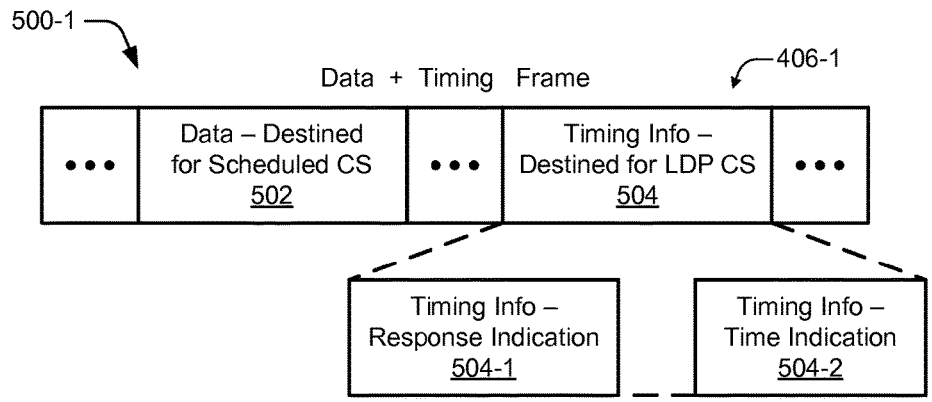
Figures 2, 5:
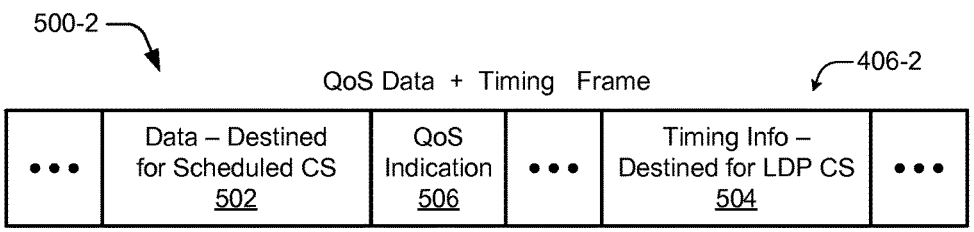
Figures 3, 5:
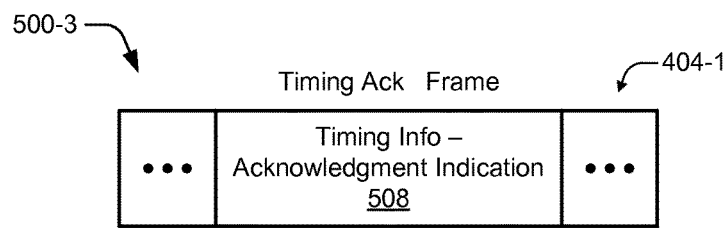

For FIG. 5-1, a data+timing frame 406-1 is depicted. Data+timing frame 406-1 includes at least two segments: [1] a data segment 502 that is destined for a client station that is scheduled for a current communication period and [2] a timing information segment 504 that is destined for a client station participating in a location determination procedure. Timing information segment 504 may include a response indication portion 504-1, a time indication portion 504-2, some combination thereof, and so forth. A time indication portion 504-2 may be populated with a time of arrival, a time of departure, a combination thereof, and so forth.

For FIG. 5-2, a QoS data+timing frame 406-2 is depicted. QoS data+timing frame 406-2 includes at least three segments: [1] a data segment 502 that is destined for a client station that is scheduled for a current communication period, [2] a QoS indication segment 506, and [3] a timing information segment 504 that is destined for a client station participating in a location determination procedure. QoS indication segment 506 includes an indication that a particular level or type of QoS is due to or is expected by the client station that is scheduled for the current communication period. QoS indication segment 506 may also or alternatively include an indication of the particular level or type of QoS. QoS indication segment 506 is depicted in FIG. 5-2 in a particular example manner. However, QoS indication segment 506 may be positioned non-adjacently to data segment 502, may be included as part of data segment 502, and so forth.

For FIG. 5-3, a timing acknowledgment frame 404-1 is depicted. Timing acknowledgment frame 404-1 includes at least one segment: [1] a timing information segment 508 that includes an acknowledgment indication of receipt of a timing-related signal. Segments 504-1, 506, and 508 include at least one of: an indication of status, an indication of a characteristic, an indication of a category, an indication of success or failure, an indication of level or type, some combination thereof, and so forth. These indications may be realized as a bit, a flag, a code, an alphanumeric value, a byte, a variable, some combination thereof, and so forth.

For example Wi-Fi implementations, a data+timing frame 406-1, a QoS data+timing frame 406-2, and a timing acknowledgment frame 404-1 may be realized using new frame types. A data+timing frame 406-1 may be realized using a "Data+FTM" frame. A QoS data+timing frame 406-2 may be realized using a "QoS Data+FTM" frame. And a timing acknowledgment frame 404-1 may be realized using an "FTM_ACK" frame. An access point may generate a Data+FTM frame or a QoS Data+FTM frame that encapsulates an original data frame destined for (e.g., meant to be transmitted to) an associated client station that is assigned to a current service period. A Data+FTM frame or a QoS Data+FTM frame also contains an FTM response or at least one FTM timestamp. A QoS indication segment 506 may be realized as or may correspond to a QoS subfield (e.g., Bit 7) of a Subtype field in a frame control portion of a header of a data frame in the IEEE 802.11 (2007) standard. For instance, a set bit (e.g., a "1") in a QoS subfield may be indicative of a QoS data frame.

Figure 6:
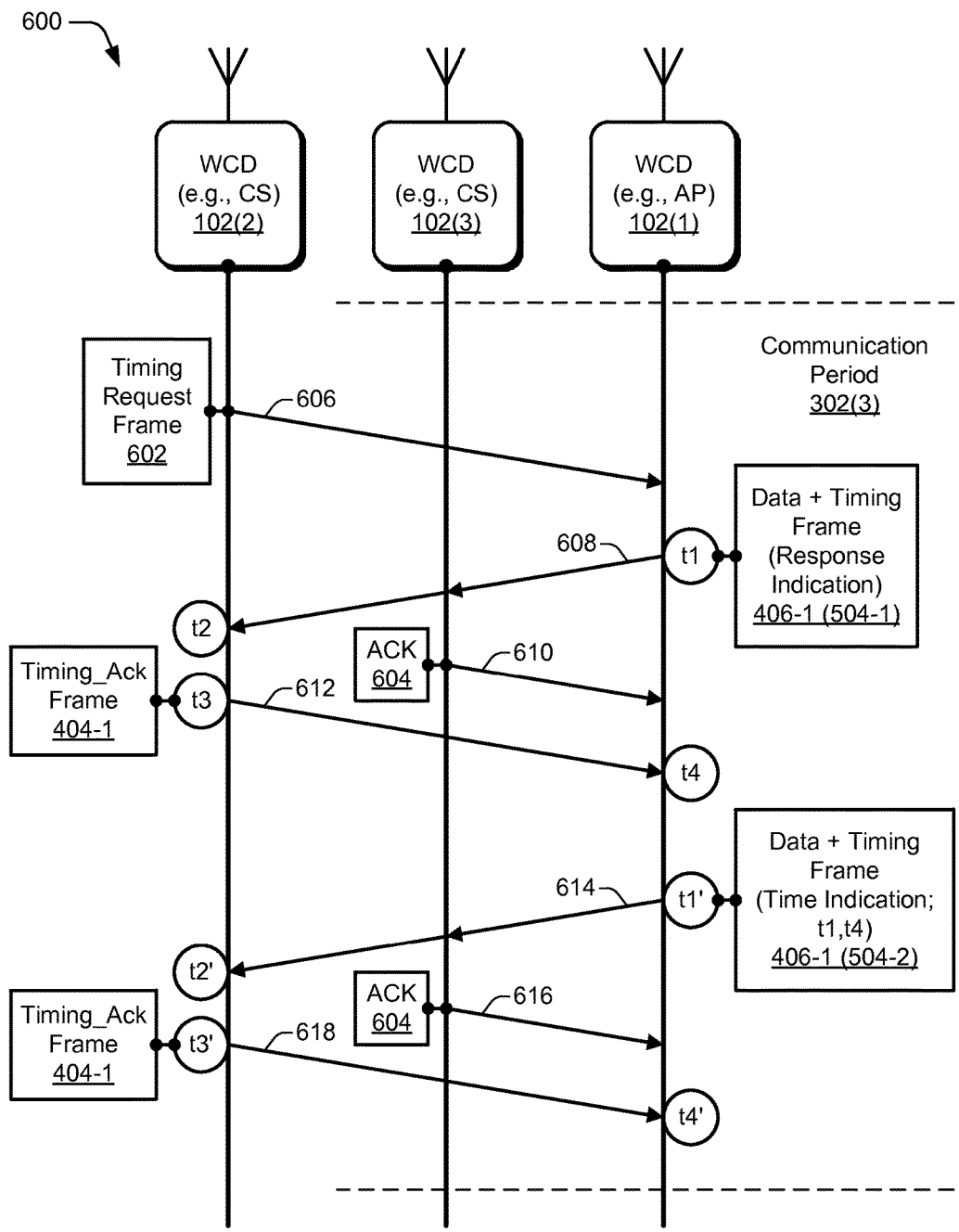
FIG. 6 depicts a sequence diagram including three wireless communication devices and multiple signals that are propagated (i) to spontaneously request a location determination procedure and (ii) to handle the request along with scheduled wireless communications in accordance with one or more example embodiments.

FIG. 6 depicts a sequence diagram 600 including three wireless communication devices 102 and signals 606-618 that are propagated to spontaneously request a location determination procedure and to handle the request along with scheduled wireless communications in accordance with one or more example embodiments. As illustrated, example sequence diagram 600 includes first wireless communication device 102(1), second wireless communication device 102(2), third wireless communication device 102(3), a third communication period 302(3), multiple signals 606-618, encircled timestamps (t1, t2, t3, t4, t1', t2', t3', and t4'), and multiple frames in which signals 606-618 are formatted.

For an example scenario illustrated in FIG. 6, first wireless communication device 102(1) may correspond to an access point, second wireless communication device 102(2) may correspond to a client station that is not associated with the access point, and third wireless communication device 102(3) may correspond to a client station that is associated with the access point. Third communication period 302(3) is assigned to third wireless communication device 102(3) such that first wireless communication device 102(1) is obligated (e.g., expected, planned, announced, or agreed upon) to communicate with third wireless communication device 102(3) during third communication period 302(3), at least if first wireless communication device 102(1) has packets to deliver to third wireless communication device 102(3).

For example embodiments, second wireless communication device 102(2) decides to spontaneously initiate a location determination procedure 206 (e.g., of FIG. 2) with first wireless communication device 102(1). A signal 606 is transmitted from second wireless communication device 102(2) and received at first wireless communication device 102(1) during third communication period 302(3). Alternatively, signal 606 may be propagated prior to third communication period 302(3). Signal 606 is formatted in accordance with a timing request frame 602 to produce a spontaneous request 310 (e.g., of FIG. 3) to participate in a location determination procedure 206 without including an indication of a requested time to perform (e.g., start) location determination procedure 206 in spontaneous request 310.

First wireless communication device 102(1) processes signal 606 and realizes that a response thereto is obligated to be transmitted during third communication period 302(3) if the response is to comport with an established expectation of a maximum permissible time for responding to the request. During third communication period 302(3), first wireless communication device 102(1) is also obligated to transmit data to third wireless communication device 102(3). Hence, a multiple recipient frame generator 106-1 (e.g., of FIG. 4) of first wireless communication device 102(1) generates a frame in accordance with a data+timing frame 406-1, or a QoS data+timing frame 406-2 if data delivery to third wireless communication device 102(3) is under a QoS agreement.

For example, first wireless communication device 102(1) generates a frame in accordance with data+timing frame 406-1 that includes a data segment 502 and a timing information segment 504, and more specifically, that includes a response indication segment 504-1. For data+timing frame 406-1, a data segment 502 is populated with third data 308(3) (e.g., of FIG. 3) that is destined for (e.g., intended for, targeted to, prepared for, transmitted towards, addressed to, belongs to, earmarked for, etc.) third wireless communication device 102(3). Response indication segment 504-1 is populated with an affirmative location determination procedure indication that is destined for second wireless communication device 102(2).

First wireless communication device 102(1) modulates signal 608 responsive to data+timing frame 406-1, including response indication segment 504-1, as generated. At a time of departure t1, first wireless communication device 102(1) transmits signal 608 and stores a value indicative of time t1.

Third wireless communication device 102(3) receives signal 608. A multiple recipient frame segmenter 106-2 (e.g., of FIG. 4) of third wireless communication device 102(3) segments data+timing frame 406-1 of signal 608 to filter out response indication segment 504-1 and extract out data segment 502. Third wireless communication device 102(3) generates a data acknowledgment frame 604. Third wireless communication device 102(3) transmits data acknowledgment frame 604 as signal 610, and first wireless communication device 102(1) receives signal 610.

At a time of arrival t2, second wireless communication device 102(2) receives signal 608 and stores a value indicative of time t2. A multiple recipient frame segmenter 106-2 of second wireless communication device 102(2) segments data+timing frame 406-1 of signal 608 to filter out data segment 502 and extract out response indication segment 504-1, which includes an affirmative indication. Second wireless communication device 102(2) generates a counterpart frame for a location determination procedure 206 that comports with a timing acknowledgment frame 404-1. More specifically, a timing acknowledgment indication segment 508 may be populated with an acknowledgment indicative that signal 608 was received as part of a location determination procedure 206. Second wireless communication device 102(2) creates signal 612 based on timing acknowledgment frame 404-1 as generated. At a time of departure t3, second wireless communication device 102(2) transmits signal 612 and stores a value indicative of time t3. At a time of arrival t4, first wireless communication device 102(1) receives signal 612 and stores a value indicative of time t4.

For example embodiments, after an initial burst of signals 608 and 612 that establish one or more time indications (e.g., t1, t2, t3, or t4), first wireless communication device 102(1) is to transmit another signal that communicates at least one of the established time indications as part of a location determination procedure 206. Third communication period 302 (3) continues to be extant. Hence, a multiple recipient frame generator 106-1 of first wireless communication device 102(1) generates a frame in accordance with data+timing frame 406-1.

For example, first wireless communication device 102(1) generates an additional frame in accordance with data+timing frame 406-1 that includes a data segment 502 and a timing information segment 504, and more specifically, that includes a time indication segment 504-2. For data+timing frame 406-1, a data segment 502 is populated with additional third data 308(3) that is destined for third wireless communication device 102(3). Time indication segment 504-2 is populated with one or more time indications known to first wireless communication device 102(1), such as a first time indication t1 and a fourth time indication t4, that are destined for second wireless communication device 102(2).

First wireless communication device 102(1) creates signal 614 responsive to data+timing frame 406-1, including time indication segment 504-2, as generated. At a time of departure t1', first wireless communication device 102(1) transmits signal 614. Third wireless communication device 102 (3) receives signal 614. A multiple recipient frame segmenter 106-2 of third wireless communication device 102(3) segments data+timing frame 406-1 of signal 614 to filter out time indication segment 504-2 and extract out data segment 502 having additional third data 308(3). Third wireless communication device 102(3) generates an additional data acknowledgment frame 604. Third wireless communication device 102(3) transmits additional data acknowledgment frame 604 as signal 616, and first wireless communication device 102(1) receives signal 616.

At a time of arrival t2', second wireless communication device 102(2) receives signal 614. A multiple recipient frame segmenter 106-2 of second wireless communication device 102(2) segments data+timing frame 406-1 of signal 614 to filter out data segment 502 and extract time indication segment 504-2, which includes at least one time indication, such as a first time indication t1 and a fourth time indication t4. Second wireless communication device 102(2) generates a counterpart frame for a location determination procedure 206 that comports with timing acknowledgment frame 404-1. More specifically, a timing-related acknowledgment indication segment 508 is populated with an acknowledgment indicative that signal 614 was received or that the one or more timing indications were obtained as part of a location determination procedure 206.

Second wireless communication device 102(2) modulates signal 618 based on timing acknowledgment frame 404-1 as generated. At a time of departure t3', second wireless communication device 102(2) transmits signal 618. At a time of arrival t4', first wireless communication device 102(1) receives signal 618. Using one or more time indications (e.g., a first time indication t1, a second time indication t2, a third time indication t3, or a fourth time indication t4), second wireless communication device 102(2) may perform a location determination operation 214 (e.g., of FIG. 2).

For example Wi-Fi implementations, with a new frame of Data+FTM, QoS Data+FTM, or FTM_ACK, if an access point receives an FTM request from a non-associated client station with an ASAP bit that is set while operating with a S-APSD mechanism, the access point may respond to the FTM request and still continue abiding by one or more pre-assigned service periods corresponding to one or more associated client stations for the S-APSD operating mechanism using a Data+FTM or QoS Data+FTM frame. An associated client station that is assigned to a current service period may extract out for processing data that is included in the Data+FTM or QoS Data+FTM frame. After receiving from the access point the Data+FTM or QoS Data+FTM frame that is responsive to the FTM request, a location-determination-procedure-initiating, non-associated client station sends an FTM_ACK frame back to the access point. The access point can generate a timestamp t1 from a time of departure of the Data+FTM or QoS Data+FTM frame and can generate a timestamp t4 from a time of arrival of the FTM_ACK frame. The non-associated client station snoops on multiple recipient frames to establish timestamps t1-t4 with the access point and to obtain timestamp t1 and timestamp t4 from the access point. The non-associated client station can internally obtain timestamp t2 by recording a time of arrival of the Data+FTM or QoS Data+FTM frame and can internally obtain timestamp t3 by recording a time of departure of the FTM_ACK frame.

FIG. 7 is a flowchart illustrating an example process 700 for enabling spontaneous location determination in a scheduled wireless communication environment for an access point in accordance with one or more example embodiments. Process 700 is described in the form of a set of blocks 702-706 that specify operations that may be performed; however, operations are not necessarily limited to the order shown in FIG. 7 or described herein, for the operations may be implemented in alternative orders or in fully or partially overlapping manners. Operations represented by the set of blocks in process 700 may be performed by a wireless communication device 102, such as a first wireless communication device 102(1) that is functioning as an access point. For certain example embodiments, a transceiver (e.g., a transceiver 104 of FIGS. 1, 2, 4, and 9) at least partially performs operation(s) of blocks 702 and 706, and a multiple recipient communication system (e.g., a multiple recipient communication system 106 of FIGS. 1, 4, and 9) at least partially performs operation(s) of block 704.

At block 702, a request to participate in a location determination procedure that is to occur at least partially during a communication period that is assigned to a third wireless communication device is received from a second wireless communication device. For example, a first wireless communication device 102(1) may receive from a second wireless communication device 102(2) a spontaneous request 310, which is formulated in accordance with a timing request frame 602 in an ASAP or equivalent unscheduled mode, to participate in a location determination procedure 206 that is to occur at least partially during a third communication period 302(3) that is assigned to a third wireless communication device 102(3).

At block 704, a multiple recipient frame is generated that encapsulates (i) data that is destined for the third wireless communication device and (ii) a response to the request to participate in the location determination procedure, with the response destined for the second wireless communication device. For example, first wireless communication device 102(1) may generate (e.g., formulate, create, or populate fields of) a multiple recipient timing-related frame 406-1 or 406-2 that encapsulates (i) third data 308(3) for a data segment 502 that is destined for third wireless communication device 102(3) and (ii) a response indication 504-1 for request 310, with response indication 504-1 destined for second wireless communication device 102(2).

At block 706, the multiple recipient frame is transmitted during the communication period that is assigned to the third wireless communication device. For example, first wireless communication device 102(1) may transmit multiple recipient timing-related frame 406-1 or 406-2 as a radio frequency (RF) signal during third communication period 302(3), which is assigned to third wireless communication device 102(3).

Figure 8:
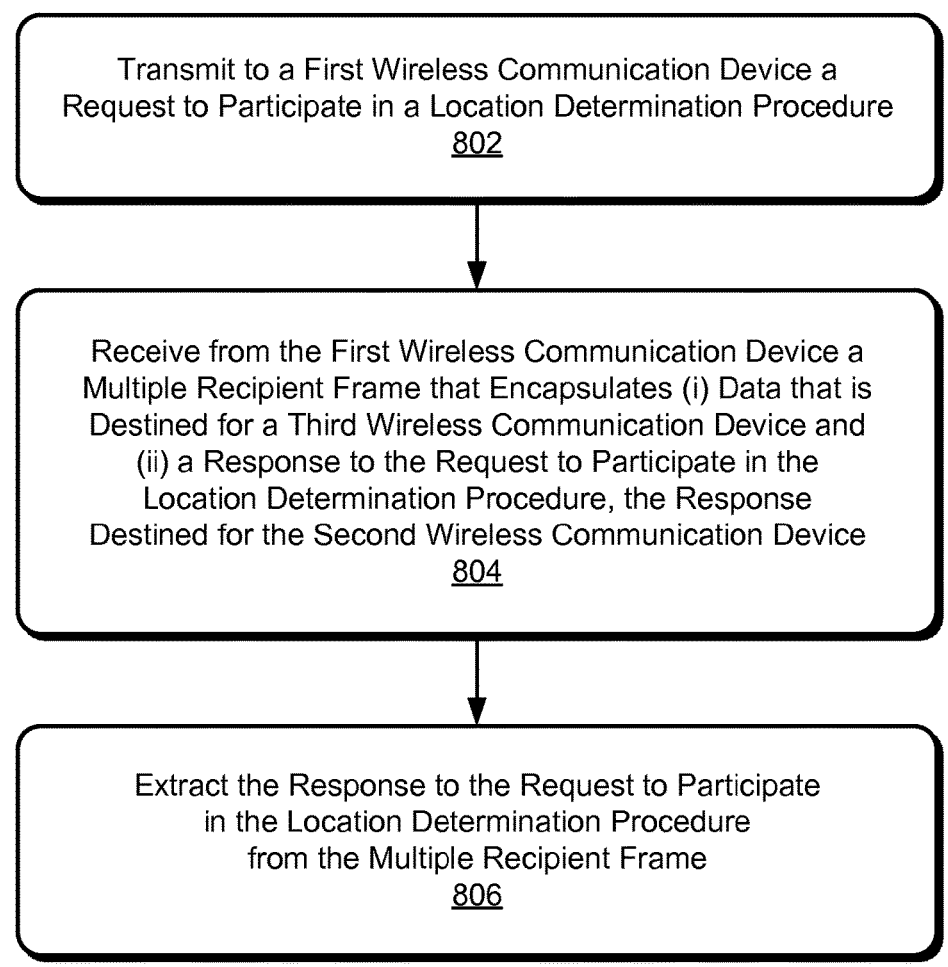
FIG. 8 is a flowchart illustrating an example process for enabling spontaneous location determination in a scheduled wireless communication environment for a client station in accordance with one or more example embodiments.

FIG. 8 is a flowchart illustrating an example process 800 for enabling spontaneous location determination in a scheduled wireless communication environment for a client station in accordance with one or more example embodiments. Process 800 is described in the form of a set of blocks 802-806 that specify operations that may be performed; however, operations are not necessarily limited to the order shown in FIG. 8 or described herein, for the operations may be implemented in alternative orders or in fully or partially overlapping manners. Operations represented by the set of blocks in process 800 may be performed by a wireless communication device 102, such as a second wireless communication device 102(2) that is functioning as a client station. For certain example embodiments, a transceiver (e.g., a transceiver 104 of FIGS. 1, 2, 4, and 9) at least partially performs operation(s) of blocks 802 and 804, and a multiple recipient communication system (e.g., a multiple recipient communication system 106 of FIGS. 1, 4, and 9) at least partially performs operation(s) of block 806.

At block 802, a request to participate in a location determination procedure is transmitted to a first wireless communication device. For example, a second wireless communication device 102(2) may transmit to a first wireless communication device 102(1) a spontaneous request 310 to participate in a location determination procedure 206, with spontaneous request 310 formulated in accordance with a timing request frame 602 in an ASAP or equivalent unscheduled mode.

At block 804, from the first wireless communication device, a multiple recipient frame is received that encapsulates (i) data that is destined for a third wireless communication device and (ii) a response to the request to participate in the location determination procedure, with the response destined for the second wireless communication device. For example, second wireless communication device 102(2) may receive from first wireless communication device 102(1) a multiple recipient timing-related frame 406-1 or 406-2 that encapsulates (i) third data 308(3) as part of data segment 502 that is destined for a third wireless communication device 102(3) and (ii) a response indication 504-1 for request 310, with response indication 504-1 destined for second wireless communication device 102(2).

At block 806, the response to the request to participate in the location determination procedure is extracted from the multiple recipient frame. For example, second wireless communication device 102(2) may extract from multiple recipient timing-related frame 406-1 or 406-2 response indication 504-1 for request 310, with response indication 504-1 comprising an affirmative indication by first wireless communication device 102(1) to participate in location determination procedure 206.

In one or more example embodiments as described herein, enablement of spontaneous location determination in a scheduled wireless communication environment may use, or may be implemented in conjunction with or in an environment involving, at least one communication protocol that is compliant with Wi-Fi networking, such as a network implementing or comporting with at least a portion of an IEEE 802.11 standard (e.g., as discussed in the IEEE Std. 802.11-2012, Mar. 29, 2012). Nevertheless, although reference may be made herein to an IEEE 802.11 standard or various aspects thereof (e.g., channels, frequencies, message or frame types, station types or roles/responsibilities, air interface formats or guidelines, timing measurement procedures, or protocol specifications), the techniques and approaches described herein may additionally or alternatively be implemented using one or more other (e.g., wireless) standards or signaling technologies.

Figure 9:
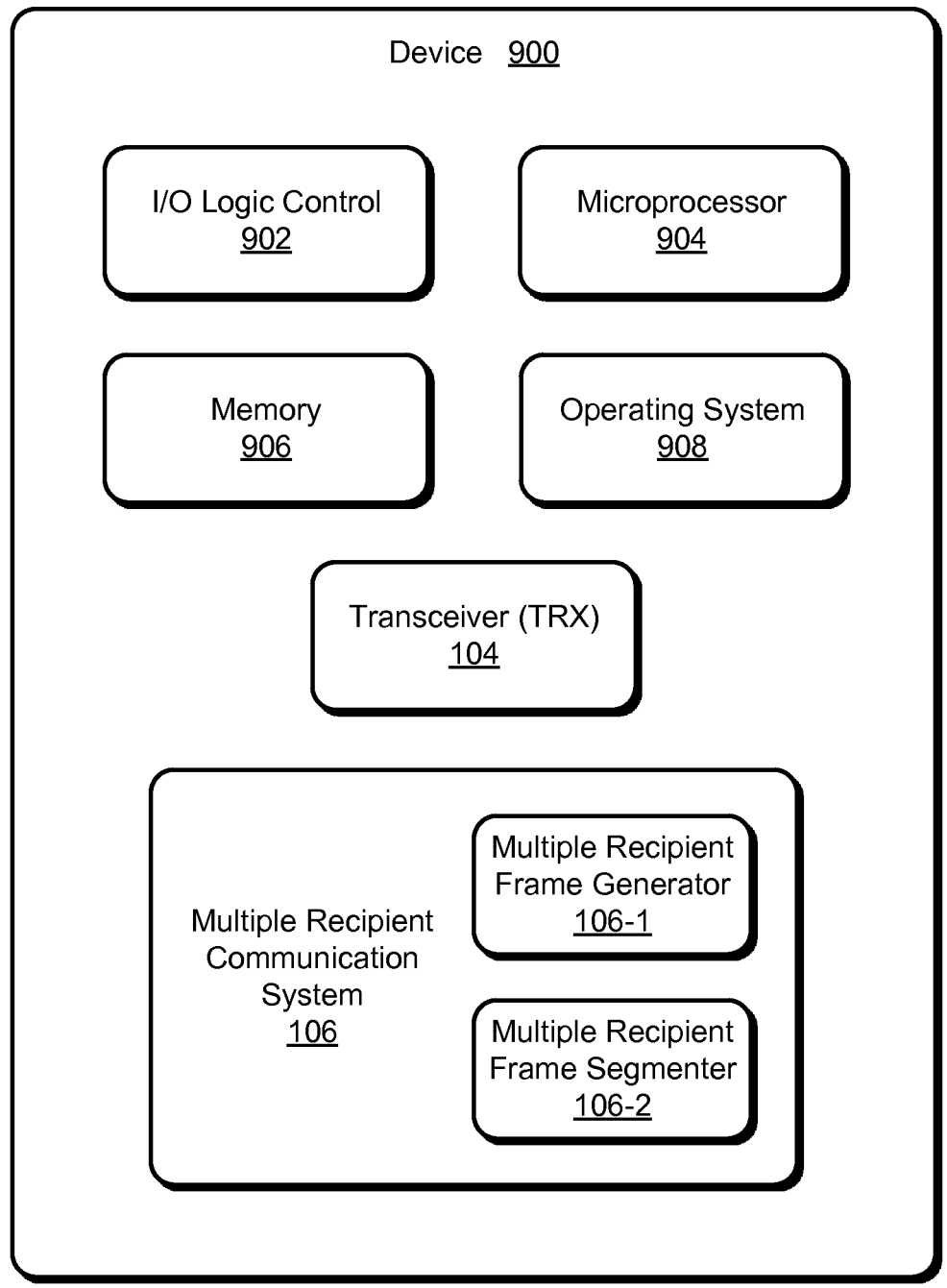
FIG. 9 depicts an example device that can implement various aspects of the mechanisms and processes described herein.

FIG. 9 depicts an example device 900 that can implement various aspects of the mechanisms and processes described herein. For certain example embodiments, device 900 may be realized as any one or more of a variety of different devices, including but not limited to, a media device, a computer device, an entertainment appliance such as a television set-top box, a video processing and/or rendering device, an Ethernet interface, a switch, an access point (AP), a home appliance device, a gaming device, an electronic device, a wireless router, a vehicle, a workstation, a smart phone, a tablet, a printer, a home automation device, a security or safety device such as a camera or a fire detector or a door lock, a wearable such as a smart watch or intelligent glasses or a jacket or bag, a Wi-Fi chip, another type of computing device, or some combination thereof. Device 900 may be implemented as a System-on-Chip (SoC).

For certain example implementations, device 900 may include electronic circuitry, which has at least one hardware component or tangible aspect; at least one microprocessor; at least one memory; input-output (I/O) logic control; one or more modules; one or more communication interfaces or components; other hardware, firmware, or software applicable to enabling a device to function; some combination thereof; and so forth. Device 900 may also include at least one internal (e.g., integrated) data bus (not explicitly shown in FIG. 9) that couples various components of the device for data communication between or among the various components. A wireless communication device that comprises device 900 or that includes device 900 as a sub-part thereof may be implemented with many combinations of differing components.

Continuing with FIG. 9, example device 900 as illustrated may include various components such as an input-output (I/O) logic control 902 (e.g., which may include electronic circuitry) or a microprocessor 904 (e.g., at least one of a microcontroller, a digital signal processor (DSP), a power-efficient mobile-oriented processing unit, or a combination thereof). Device 900 may also include at least one memory 906, which may include any one or more types of memory, such as random access memory (RAM), low-latency non-volatile memory (e.g., Flash memory), read only memory (ROM), one-time programmable memory, other suitable electronic or solid state data storage, some combination thereof, and so forth. By way of example only, memory 906 may include one or more tangible or non-transitory storage media. Additionally or alternatively, device 900 may include a memory interface for accessing supplementary or removable or expandable memory, such as off-chip memory or an external Flash memory module.

Device 900 may also include various stored, executable, or executing firmware or software, such as an operating system 908, which may include computer-executable instructions maintained by memory 906 and executed by microprocessor 904. Device 900 may also include other various communication interfaces; communication components; other hardware, firmware, or software; some combination thereof; and so forth. An example of one or more communication components may include, but is not limited to, at least one transceiver (TRX) 104 (e.g., which is described herein above with particular reference to at least FIG. 1).

Example device 900 may also include a multiple recipient communication system 106 that enables spontaneous location determination in a scheduled wireless communication environment to be implemented as described herein. A multiple recipient communication system 106 may include a multiple recipient frame generator 106-1, a multiple recipient frame segmenter 106-2, a combination thereof, and so forth. A multiple recipient communication system 106 is explicitly illustrated in FIGS. 1, 4, and 9. However, various example embodiments or implementation aspects of a multiple recipient communication system 106 are described hereinabove with reference to any one or more of FIGS. 1-8. A multiple recipient communication system 106 may be implemented in hardware, firmware, software, combinations thereof, and so forth.

Further aspects of the present invention relate to one or more of the following clauses.

A first wireless communication device includes a transceiver and a multiple recipient communication system. The transceiver is configured to receive, from a second wireless communication device, a request to participate in a location determination procedure that is to occur at least partially during a communication period that is assigned to a third wireless communication device. The multiple recipient communication system is configured to generate a multiple recipient frame that encapsulates (i) data that is destined for the third wireless communication device and (ii) a response to the request to participate in the location determination procedure, with the response being destined for the second wireless communication device.

With respect to the first wireless communication device, the request to participate in the location determination procedure includes a fine timing measurement request frame, and the communication period that is assigned to the third wireless communication device includes a service period that corresponds to the third wireless communication device.

With respect to the first wireless communication device, the first wireless communication device comprises an access point; the second wireless communication device comprises a first client station that is not associated with the access point; and the third wireless communication device comprises a second client station that is associated with the access point. Further, the access point is configured to assign the second client station to the communication period.

With respect to the first wireless communication device, the transceiver is further configured to transmit the multiple recipient frame during the communication period that is assigned to the third wireless communication device.

With respect to the first wireless communication device, the transceiver is further configured (i) to receive, from the third wireless communication device, a first acknowledgment frame for the data and (ii) to receive, from the second wireless communication device, a second acknowledgement frame for the response to the request to participate in the location determination procedure.

With respect to the first wireless communication device, a first time indication corresponds to a time of transmission from the first wireless communication device of the multiple recipient frame, and a fourth time indication corresponds to a time of reception at the first wireless communication device of the second acknowledgment frame. Additionally, the multiple recipient communication system is further configured to generate an additional multiple recipient frame that encapsulates (i) additional data that is destined for the third wireless communication device and (ii) location determination procedure information that includes the first time indication and the fourth time indication, with the location determination procedure information destined for the second wireless communication device. And the transceiver is further configured to transmit the additional multiple recipient frame during the communication period that is assigned to the third wireless communication device.

With respect to the first wireless communication device, the first wireless communication device comprises an access point, and the third wireless communication device is associated with the access point and operative in accordance with a scheduled automatic power save delivery (S-APSD) mechanism.

With respect to the first wireless communication device, the data is associated with a quality of service (QoS) indication. Additionally, the multiple recipient communication system is further configured to generate the multiple recipient frame to encapsulate (i) the data and the QoS indication, with the data and the QoS indication destined for the third wireless communication device, and (ii) the response to the request to participate in the location determination procedure, with the response destined for the second wireless communication device.

A second wireless communication device includes a transceiver and a multiple recipient communication system. The transceiver is configured to transmit, to a first wireless communication device, a request to participate in a location determination procedure. The transceiver is further configured to receive, from the first wireless communication device, a multiple recipient frame that encapsulates (i) data that is destined for a third wireless communication device and (ii) a response to the request to participate in the location determination procedure, with the response being destined for the second wireless communication device. The multiple recipient communication system is configured to extract the response to the request to participate in the location determination procedure from the multiple recipient frame.

With respect to the second wireless communication device, the transceiver is further configured to receive the multiple recipient frame during a communication period that is assigned to the third wireless communication device.

With respect to the second wireless communication device, the request to participate in the location determination procedure comprises a spontaneous request to participate in the location determination procedure. Additionally, the transceiver is further configured to transmit to the first wireless communication device the spontaneous request to participate in the location determination procedure without specifying a time to perform the location determination procedure.

With respect to the second wireless communication device, the spontaneous request to participate in the location determination procedure comprises a fine timing measurement (FTM) request in an as-soon-as-possible (ASAP) mode. Additionally, the transceiver is further configured to transmit to the first wireless communication device the FTM request in the ASAP mode.

With respect to the second wireless communication device, the multiple recipient communication system is further configured to generate a timing acknowledgement frame responsive to receipt of the multiple recipient frame. Additionally, the transceiver is further configured to transmit to the first wireless communication device the timing acknowledgment frame.

With respect to the second wireless communication device, the transceiver is further configured to receive from the first wireless communication device an additional multiple recipient frame that encapsulates (i) additional data that is destined for the third wireless communication device and (ii) at least one time indication for the location determination procedure, with the at least one time indication destined for the second wireless communication device. Additionally, the multiple recipient communication system is further configured to extract the at least one time indication for the location determination procedure from the additional multiple recipient frame.

With respect to the second wireless communication device, the at least one time indication includes a first time indication and a fourth time indication. Additionally, the multiple recipient communication system is further configured to: store a time of arrival for the multiple recipient frame as a second time indication; store a time of departure for the timing acknowledgment frame as a third time indication; and perform a location determination operation to compute a location of the second wireless communication device with respect to the first wireless communication device based on two or more of the first time indication, the second time indication, the third time indication, or the fourth time indication.

A method is configured to be implemented with a first wireless communication device. The method includes receiving, from a second wireless communication device, a request to participate in a location determination procedure that is to occur at least partially during a communication period that is assigned to a third wireless communication device. The method also includes generating a multiple recipient frame that encapsulates (i) data that is destined for the third wireless communication device and (ii) a response to the request to participate in the location determination procedure, with the response destined for the second wireless communication device. The method further includes transmitting the multiple recipient frame during the communication period that is assigned to the third wireless communication device.

With respect to the method, the method further includes assigning the communication period to the third wireless communication device.

With respect to the method, the response to the request to participate in the location determination procedure includes a response indication. Additionally, the method further includes: receiving, from the third wireless communication device, an acknowledgment indicative of receipt of the data encapsulated in the multiple recipient frame; and receiving, from the second wireless communication device, a timing acknowledgment frame indicative of receipt of the response indication encapsulated in the multiple recipient frame.

With respect to the method, the method also includes: storing, in a memory of the first wireless communication device, a time of departure with regard to transmission of the multiple recipient frame; receiving, from the second wireless communication device, a timing acknowledgment frame indicative of receipt of the response to the request to participate in the location determination procedure; and storing, in the memory of the first wireless communication device, a time of arrival with regard to receipt of the timing acknowledgment frame. The method further includes generating an additional multiple recipient frame that encapsulates (i) additional data that is destined for the third wireless communication device and (ii) the time of departure and the time of arrival that are destined for the second wireless communication device. The method still further includes transmitting the additional multiple recipient frame during the communication period that is assigned to the third wireless communication device.

With respect to the method, the method further includes determining that the first wireless communication device and the third wireless communication device are operating in accordance with a scheduled automatic power save delivery (S-APSD) mechanism in which the third wireless communication device is scheduled to wake up to communicate with the first wireless communication device during the communication period that is assigned to the third wireless communication device. Additionally, the generating includes encapsulating (i) the data and (ii) the response into the multiple recipient frame responsive to the determining.

One or more of the example methods or techniques or processes that are described hereinabove may take the form of at least one computer program product that is accessible from a computer-usable or computer-readable medium providing program code for use by or in connection with a computer or another processing device or any instruction execution system. For purposes of this description, a computer-usable or computer-readable medium may be any apparatus that can tangibly store a program for use by or in connection with an instruction execution system, apparatus, or device. A medium may be an electronic, magnetic, optical, electromagnetic, infrared, semiconductor, or a combination thereof, etc. system (or apparatus or device or article of manufacture). Examples of a computer-readable medium may include a semiconductor or solid state memory, a magnetic tape, a removable computer diskette, a random access memory (RAM), a read-only memory (ROM), a rigid magnetic disk, an optical disc, or a combination thereof. Examples of optical discs may include a compact disc-read only memory (CD-ROM), a compact disc-read/write (CD-R/W), digital versatile disc (DVD), or a combination thereof. A computer-usable or computer-readable medium may include computer-readable memory devices, which may include any of the devices or mediums discussed above, although it excludes signals, signal transmission, and carrier waves. With regard to terminology, unless context dictates otherwise, use herein of the word "or" may be considered use of an "inclusive or," or a term that permits inclusion or application of one or more items that are linked by the word "or" (e.g., a phrase "A or B" may be interpreted as permitting just "A," permitting just "B," or permitting both "A" and "B").

Although subject matter has been described in language specific to structural features and/or methodological operations, it is to be understood that the subject matter defined in the appended claims is not necessarily limited to the specific features or operations described above, including not being limited to organizations in which features are arranged or orders in which operations are performed.

What is claimed is:

1. A wireless communication access point device comprising:
   a microprocessor;
   a non-transitory storage media having stored thereon computer-executable instructions that, responsive to execution by the microprocessor, cause the microprocessor to:
   assign a scheduled automatic power save delivery (S-APSD) communication period to a second wireless communication device in which the second wireless communication device is scheduled to wake up to communicate with the wireless communication access point device during the S-APSD communication period;
   a transceiver configured to receive, from a first wireless communication device, a request to participate in a location determination procedure that is to occur at least partially during the S-APSD communication period that is assigned to the second wireless communication device, the first wireless communication device not being associated with the wireless communication access point device and therefore not having an assigned S-APSD communication period from the wireless communication access point device, and the request to participate in the location determination procedure comprising a fine timing measurement (FTM) request frame; and
   a multiple recipient communication system configured to:
   generate a multiple recipient frame that encapsulates (i) data that is destined for the second wireless communication device and (ii) a response to the request to participate in the location determination procedure, wherein the response is destined for the first wireless communication device; and
   transmit the multiple recipient frame for receipt by the first and second wireless communication devices.

2. The wireless communication access point device of claim 1, wherein the S-APSD communication period comprises a service period that corresponds to the second wireless communication device.

3. The wireless communication access point device of claim 1, wherein the wireless communication access point device is configured to assign the first wireless communication device to the S-APSD communication period.

4. The wireless communication access point device of claim 1, wherein:
   the transceiver is further configured to transmit the multiple recipient frame during the S-APSD communication period.

5. The wireless communication access point device of claim 1, wherein:
the transceiver is further configured (i) to receive, from the second wireless communication device, a first acknowledgment frame for the data and (ii) to receive, from the first wireless communication device, a second acknowledgement frame for the response to the request to participate in the location determination procedure.

6. The wireless communication access point device of claim 5, wherein:
a first time indication corresponds to a time of transmission from the wireless communication access point device of the multiple recipient frame;
a fourth time indication corresponds to a time of reception at the wireless communication access point device of the second acknowledgment frame;
the multiple recipient communication system is further configured to generate an additional multiple recipient frame that encapsulates (i) additional data that is destined for the second wireless communication device and (ii) location determination procedure information that includes the first time indication and the fourth time indication, the location determination procedure information destined for the first wireless communication device; and
the transceiver is further configured to transmit the additional multiple recipient frame during the S-APSD communication period that is assigned to the second wireless communication device.

7. The wireless communication access point device of claim 1, wherein:
the data is associated with a quality of service (QoS) indication; and
the multiple recipient communication system is further configured to generate the multiple recipient frame to encapsulate (i) the data and the QoS indication, the data and the QoS indication destined for the second wireless communication device, and (ii) the response to the request to participate in the location determination procedure, the response destined for the first wireless communication device.

8. A wireless communication device comprising:
a transceiver configured to:
transmit, to a wireless communication access point, a request to participate in a location determination procedure, the request comprising a fine timing measurement (FTM) request, the wireless communication device not being associated with the wireless communication access point and therefore not having an assigned scheduled automatic power save delivery (S-APSD) communication period with the wireless communication access point, and the location determination procedure to occur during an S-APSD communication period assigned by the wireless communication access point to another wireless communication device in which the other wireless communication device is scheduled to communicate with the wireless communication access point during the S-APSD communication period; and
receive, from the wireless communication access point, a multiple recipient frame that encapsulates (i) data that is destined for the other wireless communication device that has the S-APSD communication period assigned thereto and (ii) a response to the request to participate in the location determination procedure, the response to the request to participate in the location determination procedure destined for the wireless communication device;
a microprocessor; and
a non-transitory storage media having stored thereon computer-executable instructions that, responsive to execution by the microprocessor, cause the microprocessor to implement a multiple recipient communication system configured to extract the response to the request to participate in the location determination procedure from the multiple recipient frame.

9. The wireless communication device of claim 8, wherein:
the transceiver is further configured to receive the multiple recipient frame during the S-APSD communication period that is assigned to the other wireless communication device.

10. The wireless communication device of claim 8, wherein:
the request to participate in the location determination procedure comprises a spontaneous request to participate in the location determination procedure; and
the transceiver is further configured to transmit the spontaneous request to participate in the location determination procedure to the wireless communication access point without specifying a time to perform the location determination procedure.

11. The wireless communication device of claim 10, wherein:
the transceiver is further configured to transmit to the wireless communication access point the FTM request in an as-soon-as-possible mode.

12. The wireless communication device of claim 8, wherein:
the multiple recipient communication system is further configured to generate a timing acknowledgement frame responsive to receipt of the multiple recipient frame; and
the transceiver is further configured to transmit to the wireless communication access point the timing acknowledgment frame.

13. The wireless communication device of claim 12, wherein:
the transceiver is further configured to receive from the wireless communication access point an additional multiple recipient frame that encapsulates (i) additional data that is destined for the other wireless communication device and (ii) at least one time indication for the location determination procedure, the at least one time indication destined for the wireless communication device; and
the multiple recipient communication system is further configured to extract the at least one time indication for the location determination procedure from the additional multiple recipient frame.

14. The wireless communication device of claim 13, wherein the at least one time indication comprises a first time indication and a fourth time indication; and wherein:
the multiple recipient communication system is further configured to:
store a time of arrival for the multiple recipient frame as a second time indication,
store a time of departure for the timing acknowledgment frame as a third time indication, and
perform a location determination operation to compute a location of the wireless communication device with respect to the wireless communication access point based on two or more of the first time indication, the second time indication, the third time indication, or the fourth time indication.

15. A method, performed by wireless communication access point, of responding to a request to participate in a location determination procedure in a scheduled communication environment, the method comprising:
assigning a scheduled automatic power save delivery (S-APSD) communication period to a second wireless communication device in which the second wireless communication device is scheduled to wake up to communicate with the wireless communication access point during the S-APSD communication period;
receiving, from a first wireless communication device, the request to participate in the location determination procedure that is to occur at least partially during the S-APSD communication period that is assigned to the second wireless communication device, the first wireless communication device not having an assigned S-APSD communication period assigned by the wireless communication access point, the request to participate in the location determination procedure comprising a fine timing measurement (FTM) request;
generating a multiple recipient frame that encapsulates (i) data that is destined for the second wireless communication device and (ii) a response to the request to participate in the location determination procedure, the response to the request to participate in the location determination procedure destined for the first wireless communication device; and
transmitting the multiple recipient frame for receipt by the first and second wireless communication devices during the S-APSD communication period that is assigned to the second wireless communication device.

16. The method of claim 15, wherein the response to the request to participate in the location determination procedure comprises a response indication, and further comprising:

receiving, from the second wireless communication device, an acknowledgment indicative of receipt of the data encapsulated in the multiple recipient frame; and
receiving, from the first wireless communication device, a timing acknowledgment frame indicative of receipt of the response indication encapsulated in the multiple recipient frame.

17. The method of claim 15, further comprising:
storing, in a memory of the wireless communication access point, a time of departure with regard to transmission of the multiple recipient frame;
receiving, from the first wireless communication device, a timing acknowledgment frame indicative of receipt of the response to the request to participate in the location determination procedure;
storing, in the memory of the wireless communication access point, a time of arrival with regard to receipt of the timing acknowledgment frame;
generating an additional multiple recipient frame that encapsulates (i) additional data that is destined for the second wireless communication device and (ii) the time of departure and the time of arrival that are destined for the first wireless communication device; and
transmitting the additional multiple recipient frame during the S-APSD communication period that is assigned to the second wireless communication device.

18. The wireless communication access point device of claim 1, wherein the request to participate in the location determination procedure is received in an as soon-as-possible mode.

19. The method of claim 15, wherein the request to participate in the location determination procedure is received without a specified time in which the first wireless communication device would like to perform the location determination procedure.

20. The method of claim 19, wherein the request to participate in the location determination procedure is received in an as-soon-as possible mode.

* * * * *